United States Patent
McCarvill

(10) Patent No.: US 8,117,727 B2
(45) Date of Patent: Feb. 21, 2012

(54) APPARATUS AND METHOD FOR REMOVING GAS TURBINE COMPRESSOR STATOR VANE SEGMENTS WITH ROTOR IN PLACE

(75) Inventor: John R. McCarvill, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 819 days.

(21) Appl. No.: 12/236,930

(22) Filed: Sep. 24, 2008

(65) Prior Publication Data

US 2010/0071183 A1 Mar. 25, 2010

(51) Int. Cl.
*B23P 19/00* (2006.01)

(52) U.S. Cl. ......... 29/426.5; 29/889.1; 29/700; 29/254; 29/275

(58) Field of Classification Search ............... 29/889.1, 29/426.1, 700, 426.5, 254, 275, 283, 427, 29/202, 23.5, 156.8 R, 156.8 B
See application file for complete search history.

(56) References Cited

U.S. PATENT DOCUMENTS

| | | | |
|---|---|---|---|
| 3,673,668 A * | 7/1972 | Crook | 29/254 |
| 4,078,290 A * | 3/1978 | Fletcher et al. | 29/252 |
| 4,096,614 A * | 6/1978 | Brungard et al. | 29/889.1 |
| 4,805,282 A * | 2/1989 | Reaves et al. | 29/889.1 |
| 6,571,471 B2 * | 6/2003 | Hohmann | 29/889.1 |
| 2009/0265908 A1 * | 10/2009 | Corn et al. | 29/426.1 |

* cited by examiner

*Primary Examiner* — Derris Banks
*Assistant Examiner* — Azm Parvez
(74) *Attorney, Agent, or Firm* — Ernest G. Cusick; Frank A. Landgraff

(57) ABSTRACT

An apparatus and method adapted to facilitate removal of stator vane segments in a slot of a casing of a rotating machine with stator vanes segments and rotating blades. The apparatus includes a compression device adapted to apply a pushing force on a rear surface of a stator vane segment, a clearing element adapted to free adhesion materials holding the stator vane segment to the dovetailed slot of the lower casing of the rotating machine with stator vanes segments and rotating blades, and a tension device adapted to apply a pulling force on a forward part of the stator vane segment.

24 Claims, 9 Drawing Sheets

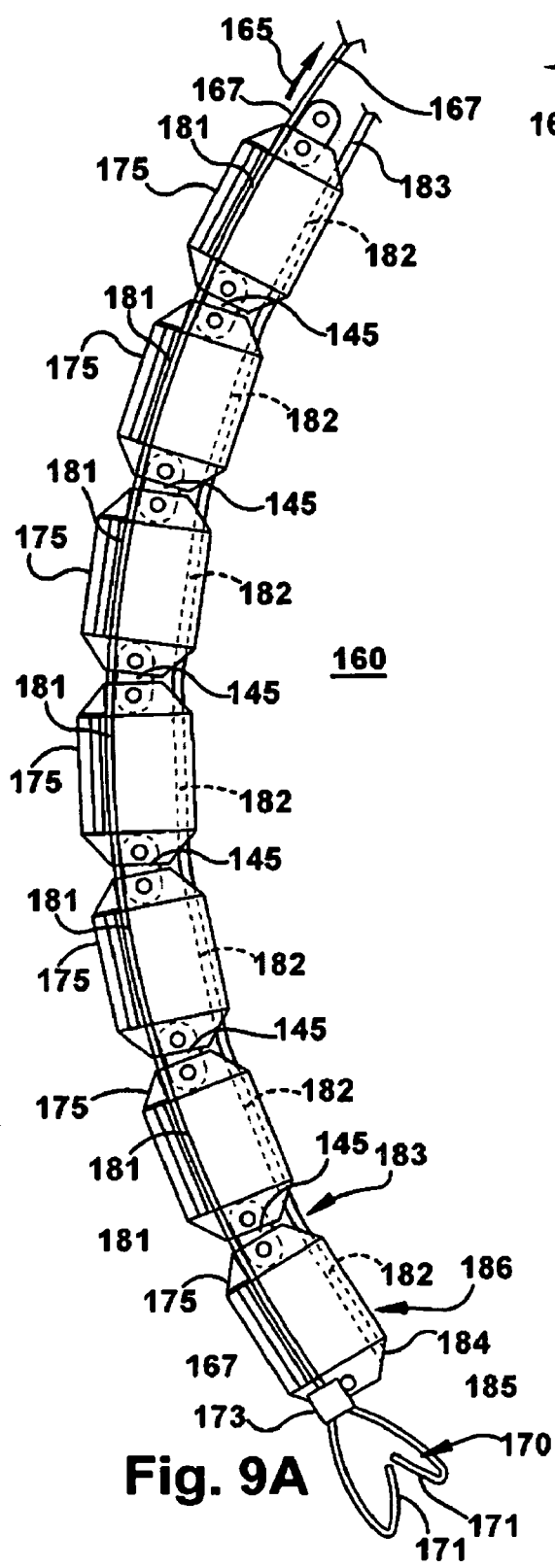
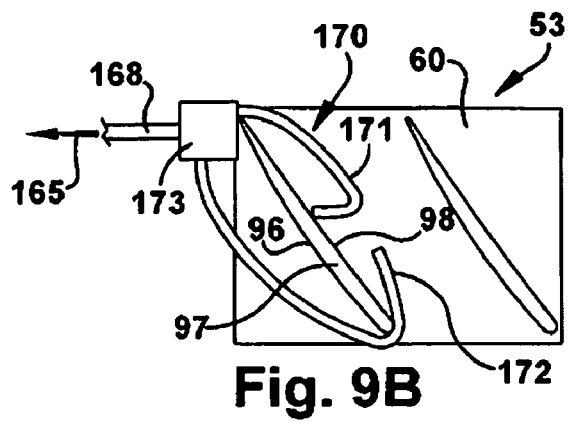
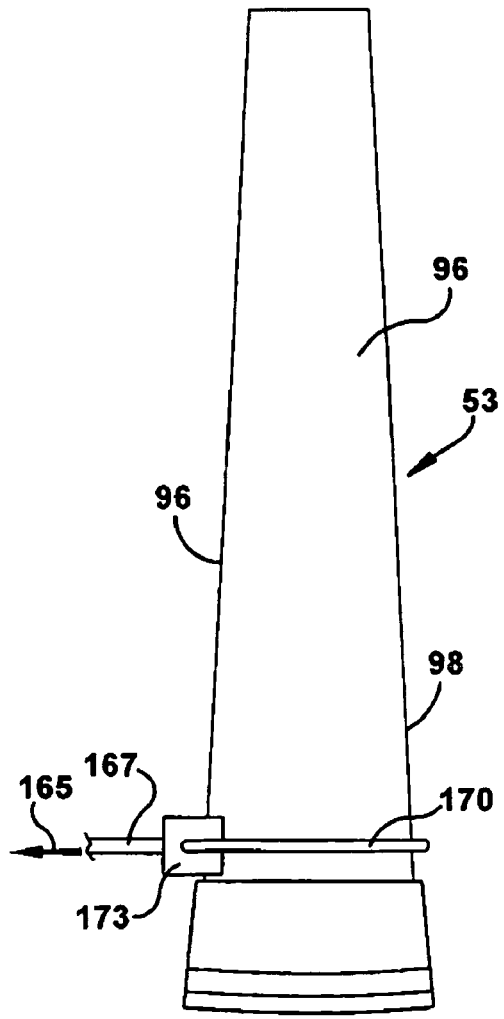
Fig. 9A
Fig. 9B
Fig. 9C

APPARATUS AND METHOD FOR REMOVING GAS TURBINE COMPRESSOR STATOR VANE SEGMENTS WITH ROTOR IN PLACE

BACKGROUND OF THE INVENTION

The invention relates generally to a gas turbine compressor and more specifically to an apparatus and method for removing stator vane segments of a gas turbine compressor with the rotor for the gas turbine compressor in place.

A conventional gas turbine generally operates on the principle of compressing air within a compressor and then delivering the compressed air to a combustion chamber where fuel is added to the air and ignited. Afterwards, the resulting combustion mixture is delivered to the turbine section of the gas turbine where a portion of the energy, generated by the combustion process, is extracted by a turbine to drive the compressor via a shaft.

In multi-stage compressor sections, stators are placed at the entrance and exit of the compressor section, as well as between each compressor stage, for purposes of properly directing the airflow to each successive compressor stage. As a result, stators are able to enhance compressor performance by appropriately influencing airflow and pressure within the compressor section.

Stators generally consist of an annular array of airfoils or vanes. Stators are typically formed in segments as stator vane segments consisting of one or more airfoils supported by the base. The base includes a dovetailed to maintain the stator vane unit within the casing. These stator vane segments are individually mounted to the compressor casing to form an annular array, so that the airfoils project radially between an adjacent pair of compressor stages. For this type of installation, a plurality of stator vane segments, with multiple blades, are assembled in the casing slot to form a stage.

FIG. 1 illustrates a top view of a lower-half casing for a compressor with the rotor removed, showing several individual casing slots for the assembly of stator vane stages. FIG. 2 illustrates a sectional view of a base of the stator vane segment within an individual casing slot.

The casing 10 has a plurality of slots 20 in horizontal flanges 15 for receiving the stator vane segments 50. A first casing slot 21 is shown without the stator vane segment. Other casing slots 22 include stator vane segments 50 with vanes 60. The slot 20 has a pair of side edges 25, each of which has a groove 30 or dovetail-shaped recess. The groove 30 holds the stator vane segments 50 in place. Each stator vane segment 50 is allowed to slide into place, with a base 55 being received in the slot 20 and the dovetail 60 being received in the grooves 30. The stator vane segments 50 for an individual stage are sequentially placed in the slot 20 of the casing 10 until the full circumferential run of the slot 20 has been filled with a designated number of stator vane segments 50.

When all stator vane slots for the casing are filled, a rotor with blades is mounted in the lower casing. The blades of the rotor occupy the space in the casing axially between the stator vanes. With the rotor in place, no access to the stator vanes is possible in an axial direction from either side. With the rotor in place and with the top half of the compressor casing removed, access is only available to the two stator vane segments, each positioned at one of the casing joints. However, direct access is not available to the other stator vane segments within slot of the lower casing half.

During prolonged operation of the compressor, adhered material 40, such as corrosion products and other foreign materials, may form in a narrow space 35 within the casing slot 20 and between the casing slot 20 and the dovetail 65 on the base 55 of the stator vane segment 50. These adhered materials 40 may tend to bind the dovetail 65 for the base 55 of the stator vane segments 50 to the inner surface 45 of the groove 30 in the casing slot 20, making removal of the stator vane segments 55 difficult.

FIG. 3 illustrates an axial cutaway view of the compressor casing between stator stages with stator vane segments installed. The casing slot 20 is filled with a center stator vane segment 80 and an outboard stator vane segment 85 to each side. Access may be available at horizontal flanges 15 to outboard stator vane segments 85, but access is limited to inboard stator vane segment 80. For other compressor stages and in other compressor arrangements more than one center stator vane segment may be installed.

No known device or method is available to remove the stator vane segments from the stator vane slots when the compressor rotor is mounted in the lower half of the casing. It has been necessary to lift and remove the compressor rotor from the lower casing, to expose stator vane segments and then manually apply a force to free and remove the stator vane segments. The need to remove the rotor of the compressor requires a heavy lift and adds additional manpower costs and delay time to the outage. Even with the rotor removed, the manual process remains difficult with restricted access between the stages of the stator vanes. The manual process requires slugging the stator vane segment with a leather covered hammer.

Accordingly, there is a need to provide a safe and efficient apparatus and method for removing the stator vane segments of the gas turbine compressor with the rotor in place such that no damage results to the stator vane segments or the gas turbine compressor.

BRIEF DESCRIPTION OF THE INVENTION

During operation of rotating machine with stator vanes segments and rotating blades gas turbine compressor operation, a dovetailed base of stator vane segments may become fixed in a slot of the rotating machine casing due to corrosion products adhering to the dovetailed base and the inner surface of the slot. Access to the stator vane segments is limited when the upper casing half is removed, but the rotor for the rotating machine is still installed.

Briefly in accordance with one aspect of the present invention, an apparatus is provided, adapted for removing a stator vane segment from a dovetailed slot in a lower casing of a rotating machine with stator vanes segments and rotating blades with an upper casing removed and the rotor in place is provided. The apparatus includes a compression device adapted to apply a pushing force on a rear surface of a stator vane segment. A clearing element is provided, which is adapted to free adhesion materials holding the stator vane segment to the dovetailed slot of the lower casing of the gas turbine compressor. A tension device is adapted to apply a pulling force to a forward surface of the stator vane segment.

In another aspect of the present invention, a method is provided for extracting stator vane segments from a casing slot of a rotating machine with stator vanes segments and rotating blades. The steps include applying a pushing force on the rear of the stator vane segment; clearing adhered materials between the stator vane segment and the casing slot; and applying a pulling force on the front side of the stator vane segment.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIG. 9A illustrates an embodiment for a tension train including tension links and a tension cable;

FIG. 9B illustrates a top view of an embodiment of a tension train connection to the leading stator vane segment.

FIG. 9C illustrates a side view of an embodiment of a tension train connection to the leading stator vane segment;

DETAILED DESCRIPTION OF THE INVENTION

The following embodiments of the present invention have many advantages, including providing an apparatus and method to remove stator vane segments from the casing slots of a rotating machine with stator vanes segments and rotating blades without necessitating removal of the machine rotor. The rotating machine may be gas turbine compressor. Avoiding removal of the rotor for the machine saves considerable time and cost during the process. Avoiding removal of the rotor also reduces safety concerns and equipment damage associated with disassembly of unit and rotor removal.

Figure 4:
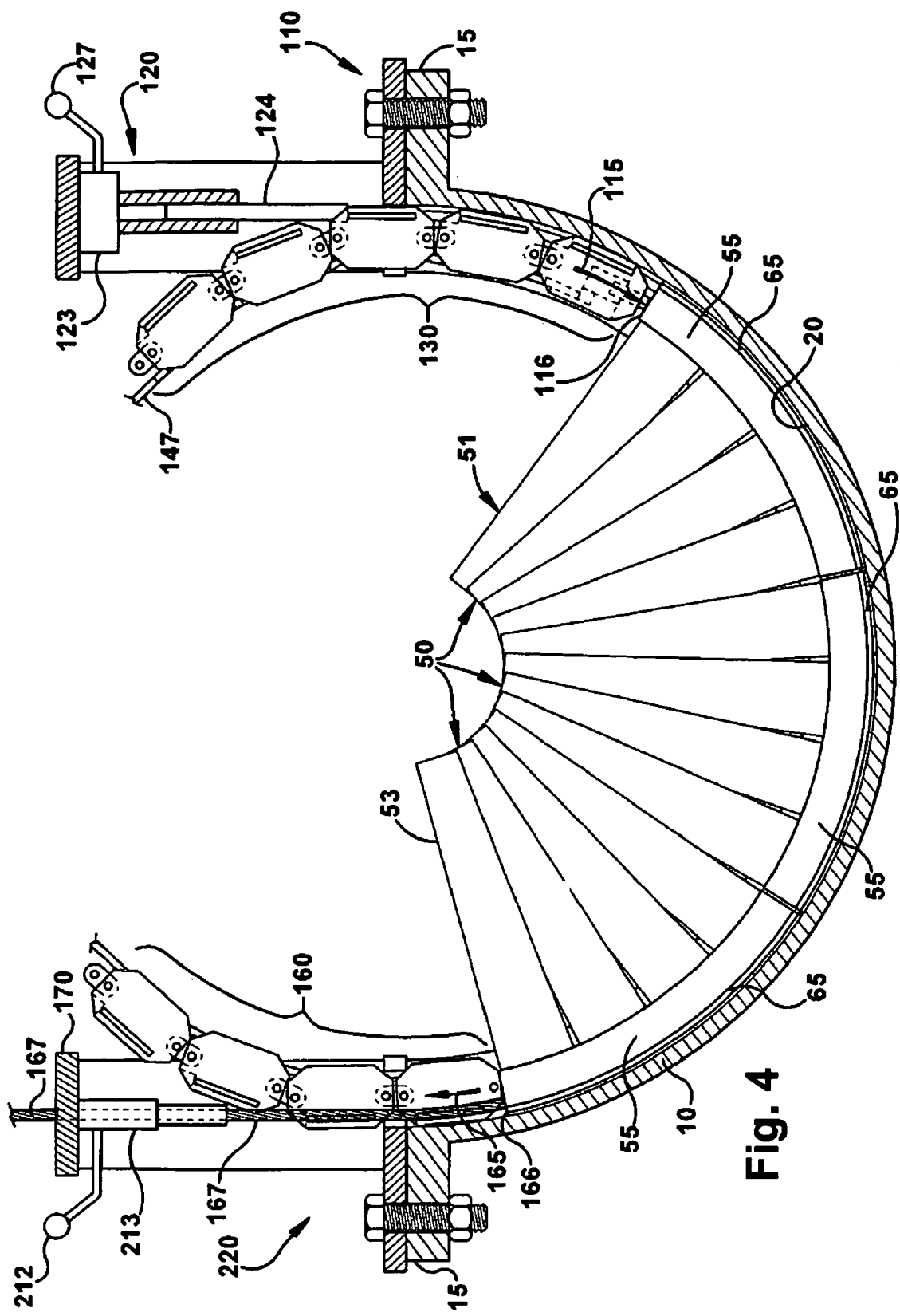
FIG. 4 provides a simplified illustration of one embodiment of the present invention for removing a plurality of stator vane segments installed in a casing slot.

The present invention includes an embodiment of an apparatus adapted to facilitate removal of stator vane segments in a slot of a casing of a rotating machine with stator vanes segments and rotating blades. The machine may be a gas turbine compressor. FIG. 4 provides a simplified illustration of one embodiment of the present invention for removing a plurality of stator vane segments 50 installed in a casing slot. The apparatus 100 includes a compression device 110 adapted to apply a pushing force 115 on a rear surface 116 of the base 55 for a trailing stator vane segment 51; a clearing element 200 adapted to free adhesion materials 40 (FIG. 2) holding the stator vane segments 50 within the slot 20 of the lower casing 10 of the gas turbine compressor; and a tension device 220 adapted to apply a pulling force 165 on a forward part 166 of the leading stator vane segment 53.

The members transmitting the pushing force to the stator vane segment will be referred to as a compression train 130. The compression train 130 in the afore-described embodiment may include compression links and an impact link.

Figure 5:
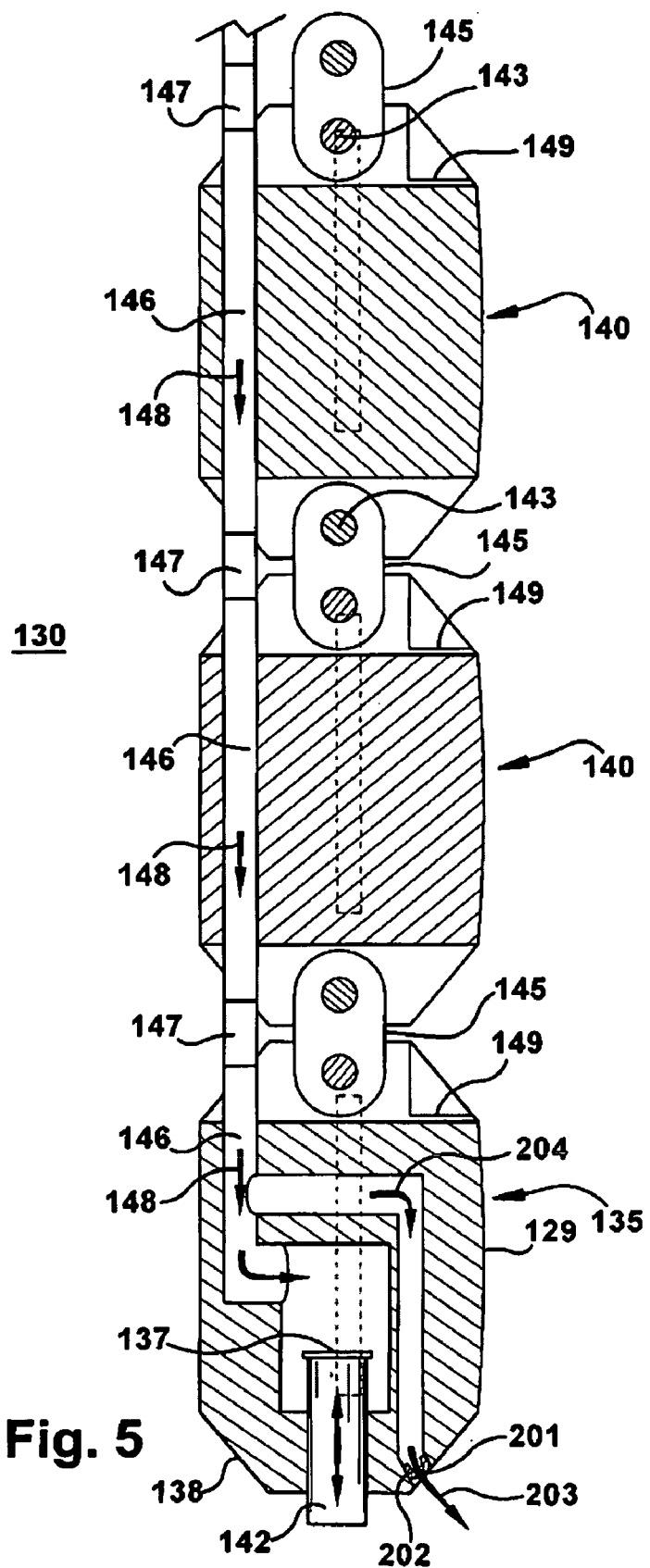
FIG. 5 illustrates an embodiment of a compression train.

FIG. 5 illustrates an internal cross-sectional view of the compression train. The compression train 130 may include an impact link 135 adapted to vibrate and push on a rear surface 116 of a trailing stator vane segment 51 within the casing slot 20; a compression unit 120 adapted to exert a backing force to allow the impact link 135 to vibrate against and push the trailing stator vane segment 51 through the casing slot 20; and a plurality of compression links 140, attached between the impact link 135 and the compression unit 120 (FIG. 4) and adapted to transmit the backing force of the compression unit 120 to the impact link 136. Internal passages 148 within the impact link 135 and the compression links 140 provide for passage of high pressure gas flow, which may be high pressure air, from a source (not shown) outside the compressor casing through the impact head. Between links, the gas flow is provided through umbilicals 147. Pivot holes 143 at the ends of the compression links 140 accept pivot pins 125 for pivot links 145 to hold the links together when a compressive force is exerted. Pivoting by the pivot links 145 allows the compression train 130 to negotiate the curvature within the casing slot.

Figure 6:
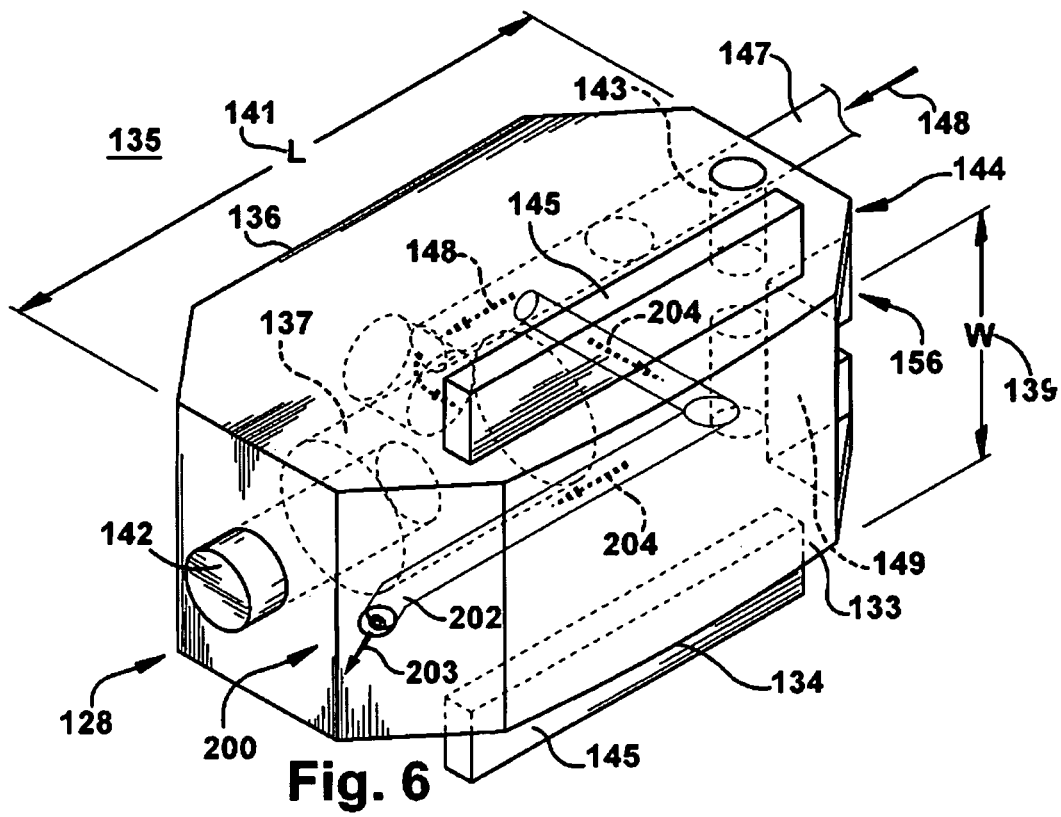
FIG. 6 illustrates an embodiment of an impact link.

FIG. 6 illustrates an embodiment of an impact link. The impact link 135 may include a body 136; an impact head 137 at a forward end 138 of the body 136; and a base 138 under the body 136, adapted to fit within the slot 20 of the lower casing 10 of the gas turbine compressor. The base 138 must also include a curved surface 134 matching that of the base for the stator vane segment 50 to allow rotational movement along the radius of casing slot 20. The base 138 may include a width 139 equivalent to the width of the base of the stator vane segment since the body must fit within the casing slot 20 between adjacent rotor blades and the dovetail 153 must conform to the grooves 30 of the casing slot 20 (FIG.2), with tolerances to allow the impact link 135 to slide. The length 141 of the body 136 may be generally sized to approximately that of a stator vane segment.

The impact head 137, known in the art, is internal to the body 136 and at a forward end 138. The impact head 137 includes a striker 142 that may reciprocate from within the forward end 138. The striker 142, when in contact with the rear surface 116 of the trailing stator vane segment 51, applies a vibrating force to the rear surface 116. Means for communicating power to the impact head may be provided in multiple ways. The impact head 137 may be powered by high-pressure gas through gas flow path 148. The high-pressure gas may be supplied by umbilical 147 from outside the casing slot. Alternately, the impact head 137 may be powered by an electric solenoid supplied by electric power through the umbilical 147. An alternate power method could also include ultrasonic or subsonic acoustics, supplied through the umbilical 147.

A connecting element is provided at the rear end of the impact link. The connecting element may include a pivot link hole 143 (or other similar mechanism) on the rear surface 144 of the impact link 135 that may be provided to attach to an adjacent compression link 150, which transmits a backing force to maintain the impact head 137 in contact with the rear surface 116 of the trailing stator vane segment 51. Pivot links 145 may attach between the pivot link holes 143 in the impact link 135 and a corresponding pivot link hole 143 in the adjacent compression link 150, being attached with pivot pins 125. On a rear surface 144, a force-transmitting pocket 149 may be provided. The force-transmitting pocket may accept a ram or other force-transmitting device from the compression unit 120 to exert itself by physical contact when the impact link 135 is in the compression unit 120.

Figure 1:
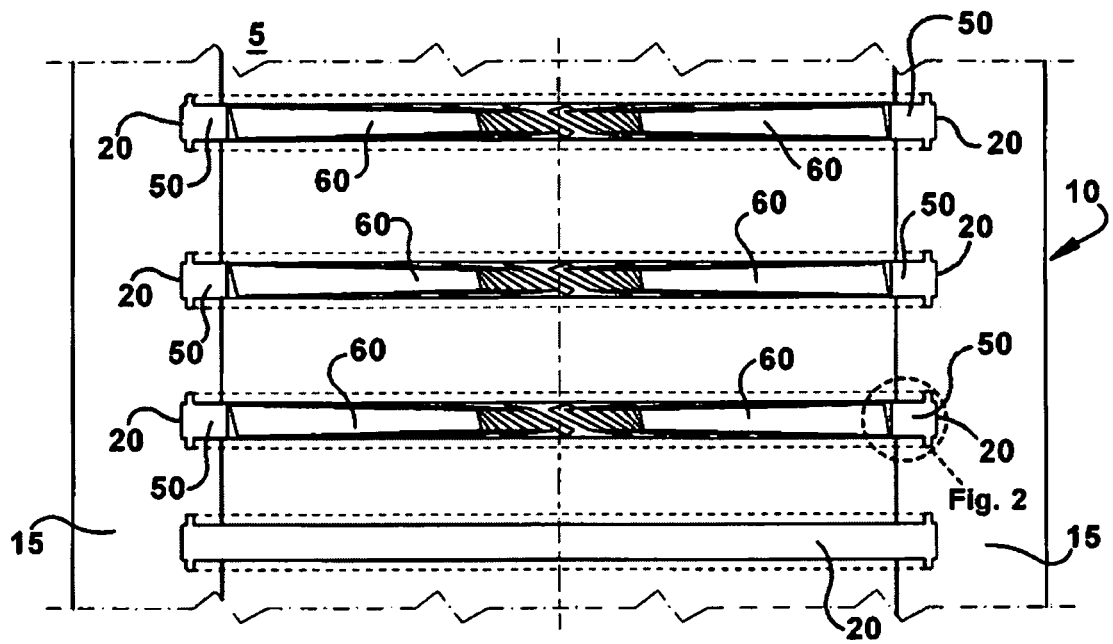
FIG. 1 illustrates a top view of a lower-half casing for a compressor with the rotor removed, showing several individual casing slots for the assembly of stator vane stages.
Figure 2:
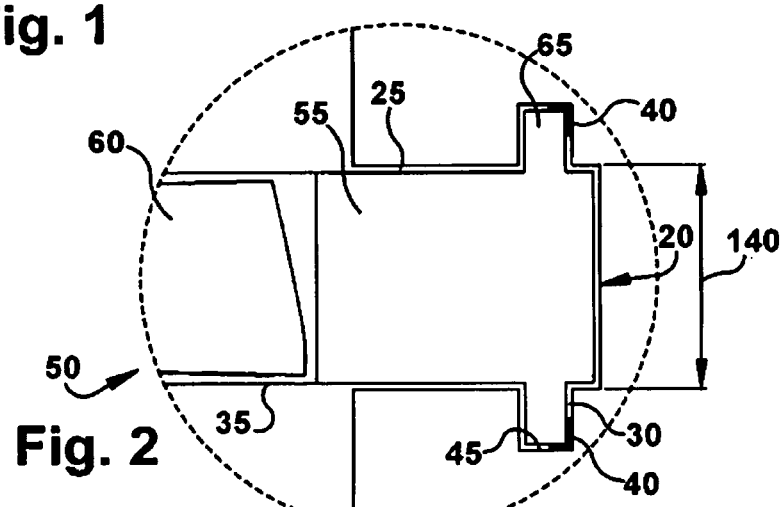
FIG. 2 illustrates a sectional view of a base of the stator vane segment within an individual casing slot.
Figure 3:
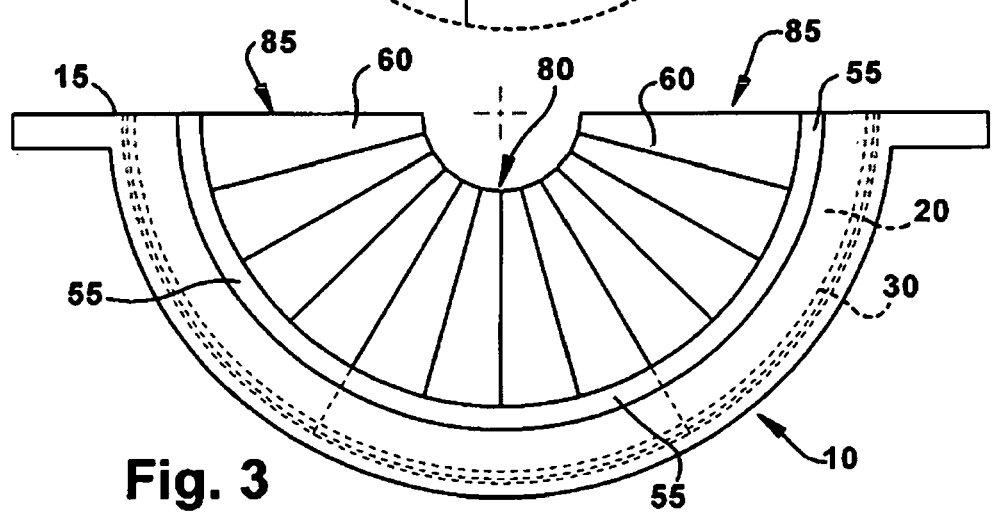
FIG. 3 illustrates an axial cutaway view of the compressor casing between stator stages with stator vane segments installed.

A clearing element 200 at a forward end 138 of the body 136 may include a nozzle 201. An internal passage 146 extending from a rear end 144 to a forward end 138 of the body 136 is adapted to communicate a high-pressure gas flow 148 to the high-pressure nozzle 201. The discharge 203 of the nozzle 202 directs the high-pressure gas 202 into the casing slot forward of the body. The discharged high-pressure gas 202 is forced between the outer surface 70 of the dovetail 65 of the trailing stator vane segment 51 and the inner surface 45 of the slot 20 of the lower casing 10 causing materials adhering 40 between the two surfaces to be freed and blown out of the slot (FIG. 2). If the impact head 137 is also powered by the high-pressure gas 202, the same high-pressure gas source and fine may be provided for both uses. The high-pressure gas flow 204 may preferably be air.

Additionally, means may be provided for dispensing a penetrating lubricant, if so desired, to assist in freeing the stator vane segment from the casing slot. Such a penetrating lubricant could be provided from an outside source via umbilical 147 and communicated through the nozzle 202 and through the above-described passages in the impact link and connecting links or through a similar additional path.

Figure 7:
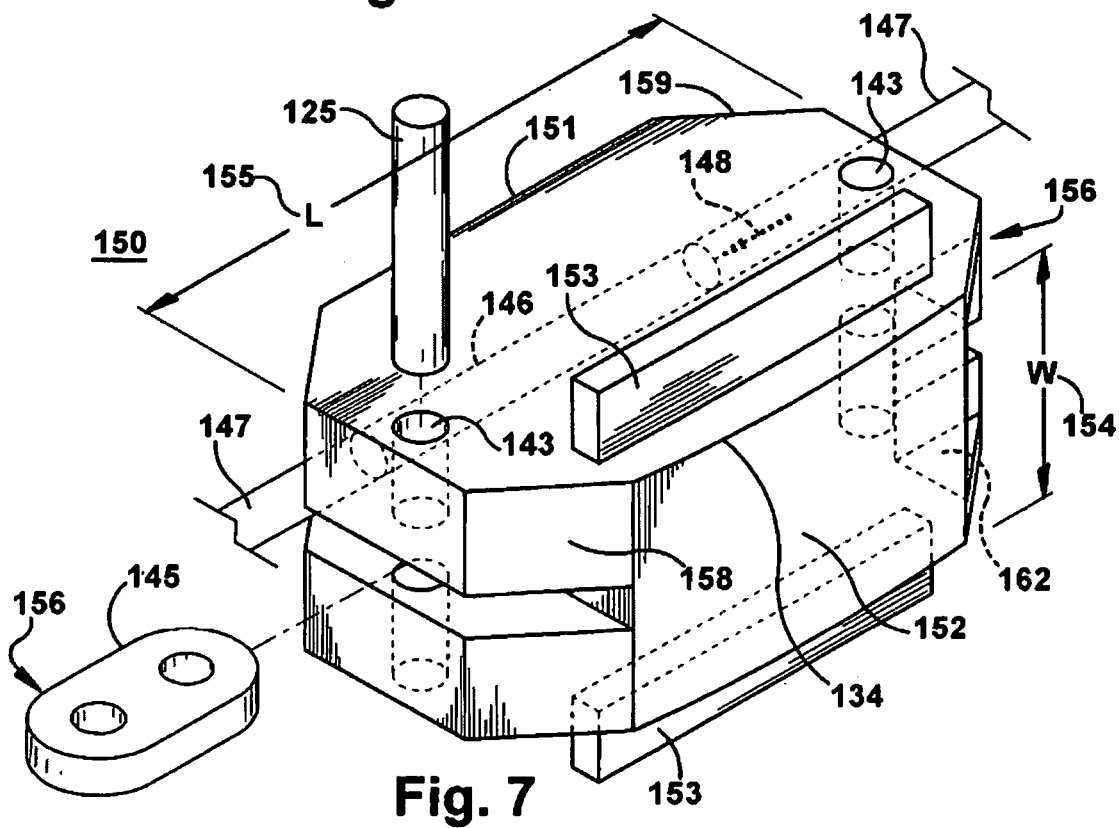
FIG. 7 illustrates an embodiment of a compression link.

FIG. 7 illustrates an embodiment of a compression link. The compression link 150 includes a body 151 with a base 152 adapted to slide within the slot 20 of the lower casing of the gas turbine compressor a body. Usually, the base 152 will include a dovetail 153 to accommodate the groove 30 within the lower casing. The base 152 and dovetail 153 must also include curved surfaces 134 matching that of the trailing stator vane segment 51 to allow rotational movement along the radius of lower casing slot 20 (FIG. 2). The body 151 may include a width 154 no wider than the width of the base of the stator vane segment since the body must fit within the space between adjacent rotor blades. The length of the body 151 may be sized preferably approximately that of the length of the stator vane segment.

A first internal passage 146 from a rear end 159 to a forward end 158 of the body 151 may be adapted to communicate high-pressure gas flow path 148 through the compression link 150. The gas flow path 148 between adjacent compression links 150 may be provided by the umbilicals 147. Alternately, the path for communicating high-pressure gas may be mounted external to the body, on the top of the body or on the side of the body. A second internal path or external path (not shown) may be provided for electric power, sonic power, etc. to the impact head 137 of the impact link 135 (FIG. 6). These alternate paths (not shown) may include brackets external to the body to hold tubing, hoses, or cables adapted to communicate power and/or high-pressure gas to the impact link 135.

The body 151 of the connecting fink 150 may also include a connecting element 156 at the forward end 157 and a connecting element 156 at the rear end 158, adapted to connect with compression links positioned forward and rearward. The connecting element 157 may include pivot link holes 143. Pivot links 145 may attach between pivot link holes 143 in the adjacent connecting links 150. The pivot links 159 maintain the compression train 130 between the adjacent connecting links 150 and transmit a backing force between individual compression links in a chain from the compression unit 120 to impact link 135.

On a rear end 159, a force-transmitting pocket 149 may be provided. The force-transmitting pocket 149 may accept a ram or other force-transmitting device from the compression unit 120 to exert itself by physical contact when the connecting link 145 is in the compression unit 120.

A further embodiment of the compression link may comprise a modified stator vane segment, with the vanes removed. The modified stator vane segment already includes a base with a size and shape to accommodate fit and sliding within the lower casing slot. The stator vane segment may be further modified to provide internal paths or external paths for communicating power for the impact link and/or high-pressure gas for the cleaning nozzle on the impact link. The base on each modified stator vane segment will abut each other when in the lower casing slot, thereby allowing the backing force to be communicated through the bases of adjacent segments, and allowing the backing force to be transmitted to the impact link, which in this embodiment could include a flat face without a connecting device, since the stator vane segments are shaped to abut each other within the slot of the compressor casing.

Figure 8:
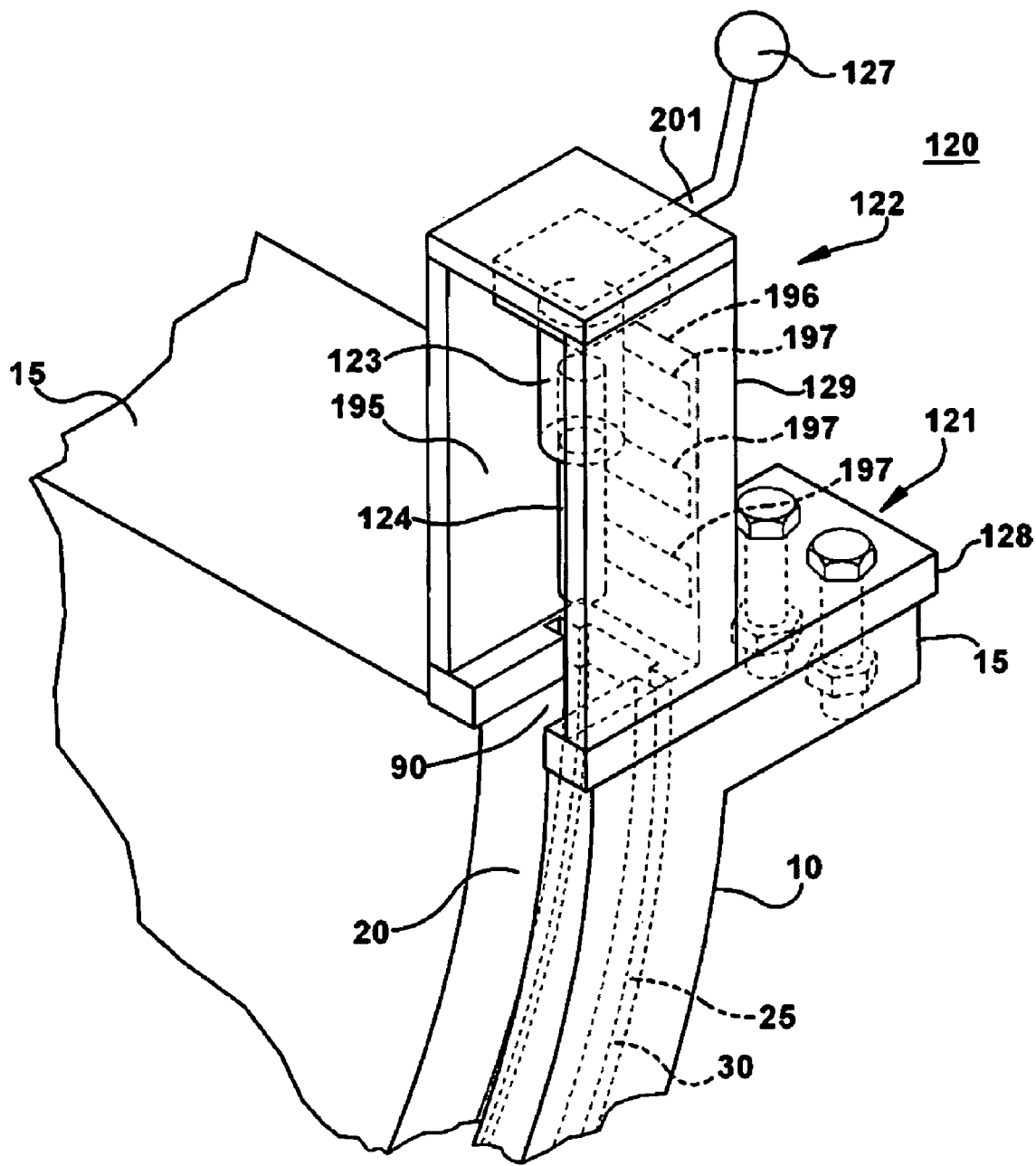
FIG. 8 illustrates one embodiment of a compression unit.
Figure 8A:
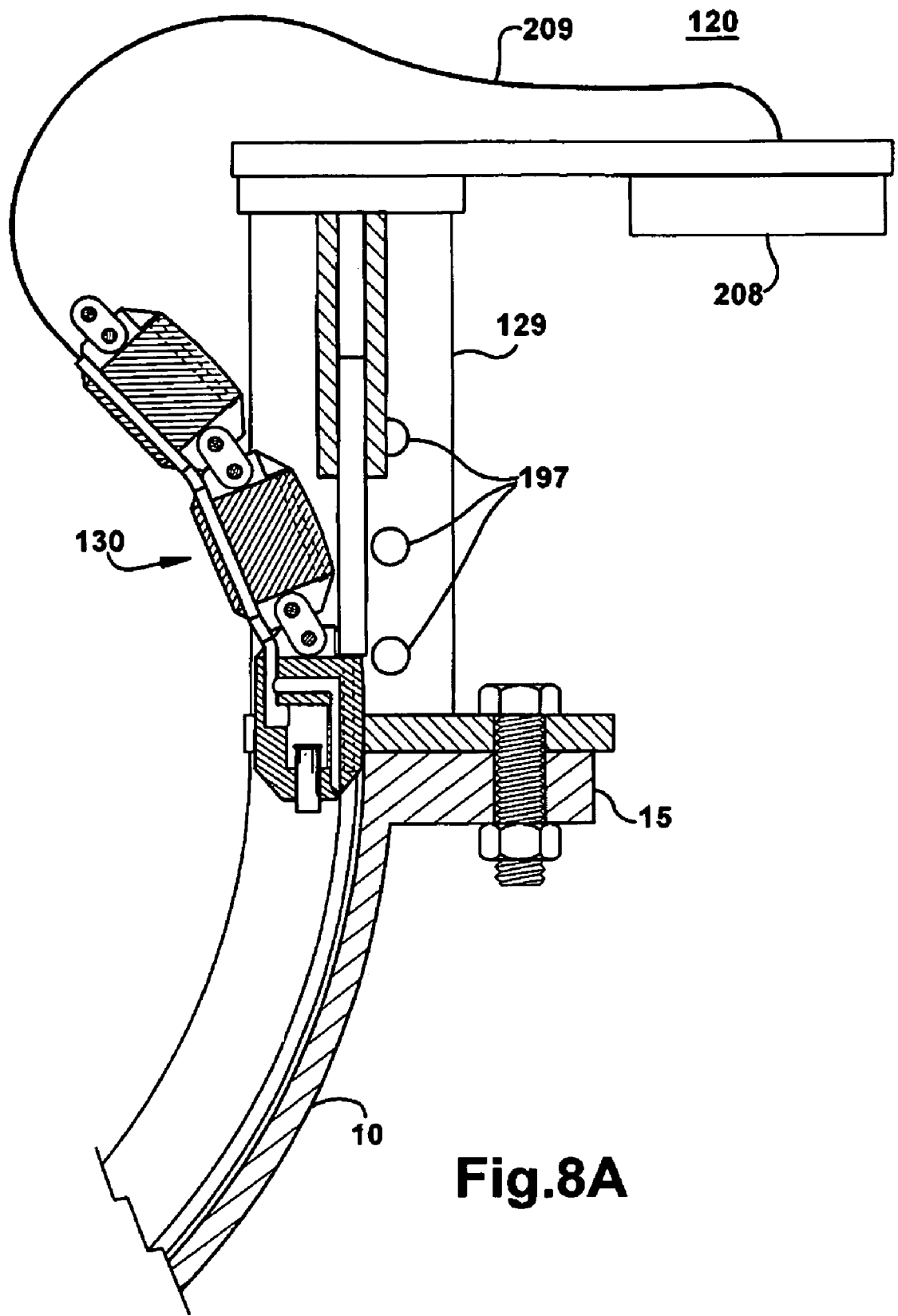
FIG. 8A illustrates an embodiment for a feeder device for the compression unit.

FIG. 8 illustrates one embodiment of a compression unit 120. The compression unit 120 may include a mounting fixture 121 adapted for mounting on the horizontal flange 15 of the lower half casing 10 above the slots 20 holding the stator vane segments (not shown) being extracted; a hydraulic ram 123; means for the hydraulic ram 123 to engage the pocket of rearmost compression link 150; means for engaging the connection links 150 from a compression link supply 126; means for inserting the connecting links 150 into the slot of the lower casing half; and a power source 127 adapted to supply the hydraulic ram 123.

The compression unit 120 may include a flange 128 adapted for bolting to the horizontal casing flange 15 on the rear side of casing slot 20. A body 129 for the compression unit 120 may be mounted vertically with respect to the horizontal flange 15 of the compressor casing. The body 129 may be arranged as a hollow thick-walled box, centered above the entrance 90 to the slot 20 in the lower half casing 15. An interior side 194, with respect to the body 129, may include an opening 195 to accept a connecting train of compression connecting links. An exterior side 196 of the body may include safety access pins 197 to allow access the connecting links 150 within the body 129 for alignment or adjustment. Within an upper end of the body 129, a ram 123 with operating piston 124 may be mounted. The ram 198 may preferentially be hydraulically operated and include a connection 201 for an external hydraulic pressure source 202. The operating piston 124 is positioned within the body 129 to provide a stroke to a force-transmitting pocket 149 of the connecting link 150 and impact link 135, thereby asserting a backforce on the link residing within the body 129 of the compression unit 120 (FIG. 4). The backforce is then transmitted through adjacent connecting links 150 in the slot 20 of the compressor casing 15 to supply the backforce to the impact link 135.

The compression unit 120 may further include a fink feed tray 208 mounted above the body 129 to allow for a smooth introduction of the compression train 130.

A tension device 220, adapted to apply the pulling force 166 through tension train 160 to a forward part 166 of a leading stator vane segment 53, may include a tension unit 168, a tension cable 167 and a plurality of tension links 175.

FIG. 9A illustrates a tension train 160 of tension links 175 with tension cable 167. FIG. 9B illustrates a top view of the tension train 160 connected to the leading stator vane segment 53. FIG. 9C illustrates a side view of the tension train 160 connected to the leading stator vane segment 53. The tension cable 167 may be attached between the tension unit 168 (FIG. 10) and the leading stator vane segment 53 and is adapted to transmit the pulling force 165 to the leading stator vane segment 53, up and out, through the slot 20 of the compressor lower casing 15. The tension cable 167 at the leading stator vane segment 53 may include a spring-loaded hook latch grapple 170. During setup of the compression train 160, the spring-loaded hook latch grapple 170 may be pressed upon the front part 96 of leading stator vane 97 of the leading stator vane segment 53 being extracted. The spring-loaded hook latch ends 171, 172 bend outward when pressed against the front part 96 of the leading stator vane 97 until the latch ends 171, 172 fix around the back 98 of the leading stator vane 97.

The tension cable 167 may also include a bead 173 that engages with a first tension link 186.

A plurality of tension links 175 may be positioned between the tension unit 168 and the leading stator vane segment 53. The tension link 175 is adapted to position the tension cable 167 along a radial arc within the slot 20 of the lower half casing 15. The tension link 175 may be similarly configured in size and shape to the compression link, previously described. Therefore, like elements of the tension links and the compression links are similarly numbered. The tension link 175 may include a body 151; means 177 on each body for positioning the tension cable 167 in the radial arc of the slot 20 in the lower half casing 10; a base 152 with dovetail, adapted to fit within the dovetail groove 30 of the lower casing 10 of the gas turbine compressor; and pivot holes 143 at a forward end 158 and a rear end 159.

A first internal path 181 from a forward end 158 to a rear end 159 of the body 176 may be adapted to pass the tension cable 167 through the tension link 175. A second internal path 182 from the forward end 158 to a rear end 159 of the body 176 may be adapted to pass an umbilical 183 for a camera 184 and forward lighting 185. Alternatively, the path for the tension cable may be mounted external to the body 176, on the top or side of the body 151. Similarly an alternate path for umbilical 183 may be mounted external to the body 151, on the top of the body. These alternate paths may include one or more brackets external to the body adapted to hold the tension cable 167 and umbilical 183. The first internal path 181 or external path maintains the tension cable 167 in a radial configuration through the radial arc of slot in the lower casing of the compressor so as to transfer the pulling force to the stator vane segment without binding on the inner surface of the casing slot 20.

The first tension link 186, adjacent to the leading stator vane segment 53, may retain the end of the umbilical 183, including camera 184 and the forward lighting 185. The camera 184 and the forward lighting 185 may be positioned to provide a field of view to facilitate the spring-loaded hook latch 171, at the end of the tension cable 167, engaging with the leading vane 97 of the leading stator vane segment 53. Further, the bead 173 on the tension cable 167 may engage with the rear end of the first tension link 186 to provide a pulling force on the tension train 164 during the extraction process.

Figure 10:
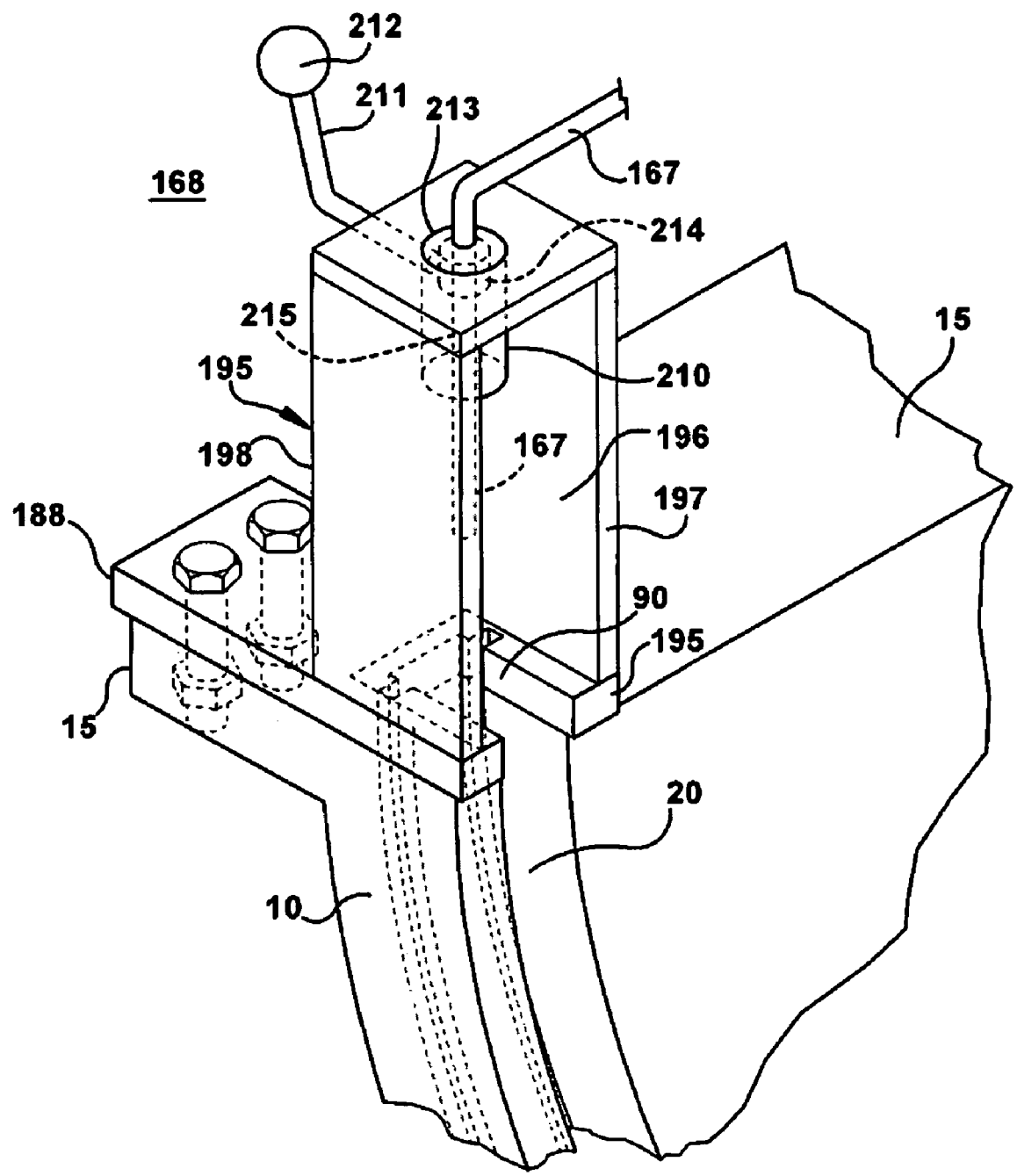
FIG. 10 illustrates an embodiment of a tension unit.

FIG. 10 illustrates an embodiment of a tension unit. The tension unit 168 includes a mounting fixture 188 adapted to mount the tension unit 168 on the horizontal flange 15 of the compressor lower casing 10; means for grasping and pulling the tension train 160; means for receiving and discharging the tension links 175 from the slot 20 of the compressor casing 10; and a power source 212 adapted to supply the tension unit.

A body 195 of the tension unit 168 may be mounted vertically with respect to the horizontal flange 15. The body 195 may be arranged as a hollow thick-walled box, centered above the entrance 90 to the slot 20 in the lower half casing 10. An opening 90 in a the body 194 and positioned above the casing slot 20 may be provided to accept tension links 167 being extracted from the casing slot 20. An interior side 197 of the body 195 with respect to the lower casing may 10 include an opening 196 to accept the tension train 160 being extracted from the casing slot 20. An exterior side 198 of the body 194 may include removable safety access pins (not shown) to allow access to the tension train 160 within the body 195 for alignment or adjustment of travel through the body.

Within an upper end of the body 164, means for grasping and pulling 213 the tension train 160 is provided. Here ram 210 may be mounted. The ram 210 may preferentially be a single-acting hollow hydraulic ram (as known in the art) and include a connection 211 for an external power source 212, which for a hydraulic ram would be a hydraulic pressure source (as known in the art). A single acting hollow hydraulic ram 213 may include a split-collar, load-bearing device 214. The split-collar, load-bearing device 214 allows the tension cable 167 to feed through a center hole 215. The single acting hydraulic ram 213, when operating in response to the pressure source 212, compresses the split-collar load-bearing device 214 on the tension cable 167 and extends the split-collar, load-bearing device 214 upward, thereby applying a pulling force to a leading stator vane segment 53.

As the pulling force moves the stator vane segment toward the tension unit, the tension links 175 are withdrawn from the slot 20 in the casing 10 and pass through the opening 196 of the body 195. The stator vane segment should be free by the time it arrives at the tension side horizontal joint. From there, once the last tension link is above the horizontal joint, the cable should be disconnected and the segment could be manually (by a service technicians hands) rolled out of the dovetail fit and removed.

The tension unit may include other embodiments capable of applying a pulling force though a tension train to the stator vane segment. For example, a further embodiment of the tension unit may include instead a chain fall, mounted above the opening to the exit side of the casing slot and adapted to attach to a tension cable, described above.

Figure 11:
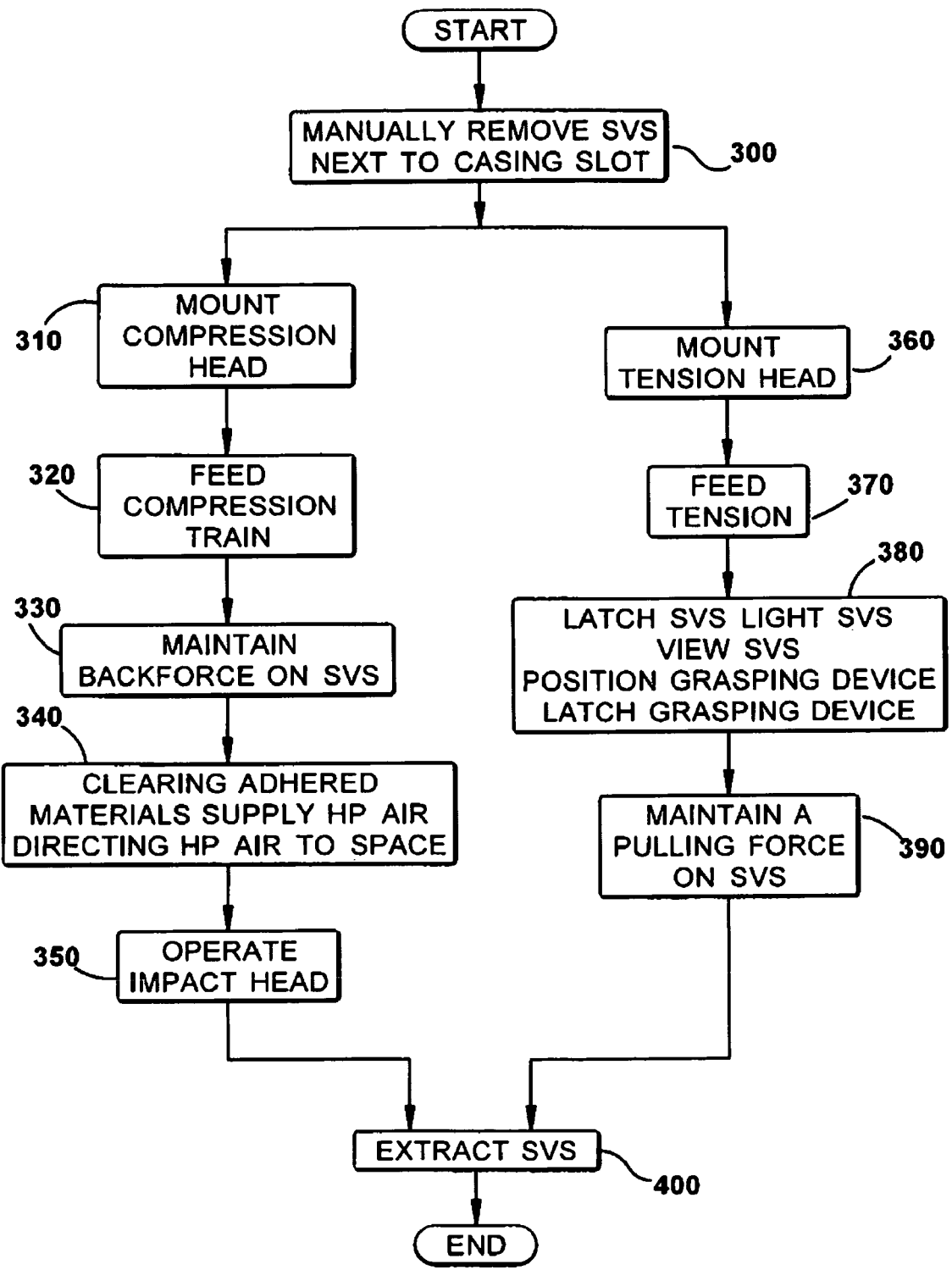
FIG. 11 illustrates a flowchart for an embodiment of a method of extracting stator vane units from a casing slot of a compressor.

According to another aspect of the present invention, a method is provided for extracting stator vane segments from a casing slot of a gas turbine compressor. FIG. 11 illustrates a flowchart of an embodiment of a method of extracting stator vane segments from a casing slot of a gas turbine compressor. The basic method includes applying a pushing force on the rear of the stator vane segment; clearing adhered materials between the stator vane segment and the casing slot; and applying a pulling force on the front side of the stator vane segment.

Initially, in step 300, an attempt may be made to manually remove a stator vane segments (SVS) next to the horizontal flange at the lower casing slot. The attempt may or may not be successful.

According to step 310 a compression unit is mounted at an opening of a stator vane segment slot in a compressor casing. Step 320 feeds a compression train through the compression unit to abut the rear end of a trailing installed stator vane segment. The compression train may be assembled in advance including the impact link at the head, followed by a plurality of connecting links. The impact link and the connecting links connected in series with connecting devices include in one embodiment of an apparatus, pivot holes at the connecting ends of the link, joined together with pivot links. Step 330 maintains a backforce with the compression unit through the compression train apply the backforce to the trailing stator vane segment. Step 340 clears adhered material operating the clearing device by applying high-pressure air to the space between the base of the SVS and the internal surface of the casing slot. Step 350 operates an impact head to vibrate the stator vane segment, under the backforce from the compression unit.

In parallel with the application of the vibration and pushing force, described above, a tension unit is mounted at an opening of a stator vane segment slot in a compressor casing in step 360. Step 370 feeds a tension train of tension links carrying a tension cablethough the tension unit to abut a leading SVS. In step 380, the leading SVS is latched with a means for grasping onto the vane of the leading SVS. The means may include a spring-loaded hook latch grapple where the spring-loaded hook latch is pressed upon the front of the leading vane of the leading SVS and latches around the back, allowing the leading vane to be used to pull the leading SVS. Forward lighting and a camera view may be used to assist in latching the leading SVS.

A pulling force from the tension unit may be maintained on the leading SVS in step 390. In step 400, the SVS are sequentially extracted through the tension unit.

While various embodiments are described herein, it will be appreciated from the specification that various combinations of elements, variations or improvements therein may be made, and are within the scope of the invention.

The invention claimed is:

1. An apparatus adapted for removing a stator vane segment from a dovetailed slot in a lower casing of a rotating machine with stator vanes segments and rotating blades with an upper casing removed and the rotor in place, comprising:
   a compression device adapted to apply a pushing force on a rear surface of a stator vane segment;
   a clearing element adapted to free adhesion materials holding the stator vane segment to a dovetailed slot of the lower casing of the gas turbine compressor; and
   a tension device adapted to apply a pulling force to a forward surface of the stator vane segment.

2. The apparatus apparatus adapted for removing a stator vane segment according to claim 1, wherein the compression device comprises:
   an impact link adapted to vibrate and push on a back surface of a stator vane segment within the dovetailed slot;
   a compression unit adapted to exert a backing force to allow the impact link to vibrate and push the stator vane segment through the dovetailed slot; and
   a plurality of compression links, attached between the impact link and the compression unit in the casing slot and adapted to transmit the backing force of the compression unit to the impact link.

3. The apparatus adapted for removing a stator vane segment according to claim 2, wherein the impact fink comprises:
   a body;
   an impact head at a forward end of the body;
   means for communicating power to the impact head through the body;
   means for communicating high pressure gas to the cleaning element at a forward end of the body; and
   a dovetailed base under the body, adapted to slide within the dovetailed slot of the lower casing of the gas turbine compressor.

4. The apparatus adapted for removing a stator vane segment according to claim 3, wherein means for communicating high pressure gas to the cleaning element at the forward end of the body further comprises means to deliver a lubricant to the cleaning element at the forward end of the body.

5. The apparatus adapted for removing a stator vane segment according to claim 3, the impact link further comprises:
   a connecting element at the rear end of the body; and
   a pocket on a rear surface, adapted to receive a backing force.

6. The apparatus adapted for removing a stator vane segment according to claim 3, the impact link further comprises:
   the clearing element including a nozzle at a forward end of the body; and
   a gas path from a rear end to a forward end of the body adapted to communicate a pressurized gas to the nozzle.

7. The apparatus adapted for removing a stator vane segment according to claim 3, the means to communicate drive power comprises: at least one of a high pressurized gas path and an electric power path to the impact head.

8. The apparatus adapted for removing a stator vane segment according to claim 2, wherein the plurality of compression links comprise:
   a body;
   at least one of a path for a power and a path for a pressurized gas from a rear end to a forward end of the compression link; and
   a dovetailed base adapted to fit within the dovetailed slot of the lower casing of the gas turbine compressor.

9. The apparatus adapted for removing a stator vane segment according to claim 2, wherein the plurality of compression links further comprise:
   means for connecting at the forward end;
   means for connecting at the rear end; and
   a pocket on a rear surface adapted to receive a backing force from the compression unit.

10. The apparatus adapted for removing a stator vane segment according to claim 7, wherein the plurality of compression links further comprise:
    a modified stator vane segment.

11. The apparatus adapted for removing a stator vane segment according to claim 2, the compression unit comprising:
    a mounting fixture adapted to mount the tension unit on the flange of the lower half casing in the rear of the stator vane segment being extracted;
    a ram;
    means for the ram engaging the pocket of the compression links;
    means for inserting the plurality of compression links into the the slot of the lower casing half: and
    a power source adapted to supply power to the ram.

12. The apparatus adapted for removing a stator vane segment according to claim 1, the tension device comprising:
    a tension unit adapted to exert a force pulling a leading stator vane segment through the dovetailed slot of the lower casing;
    a tension cable, attached between the tension unit and the leading stator vane segment, and adapted to transmit the pulling force of the tension unit to the stator vane segment;
    a plurality of tension links, positioned between the tension unit and the the stator vane segment and adapted to position the tension cable along a radial arc within the slot of the lower half casing.

13. The apparatus adapted for removing a stator vane segment according to claim 12, wherein the plurality of tension links comprise:
    a body;
    means on each body for positioning the tension cable in a radial arc of the slot in the lower half casing;
    a connecting element at the forward end;
    a connecting element at the rear end; and
    a dovetailed base adapted to fit within the dovetailed slot of the lower casing of the gas turbine compressor.

14. The apparatus adapted for removing a stator vane segment according to claim 11, wherein the tension cable comprises: means at a forward end for latching onto the vanes of the stator vane segment.

15. The apparatus adapted for removing a stator vane segment according to claim 11, the tension unit comprising:
    a mounting fixture adapted to mount the tension unit on the flange of the lower half casing;
    means for grasping the tension cable;

means for pulling the tension cable;

means for receiving and discharging the tension links from the slot of the lower casing half; and a power source adapted to supply the tension unit.

16. The apparatus apparatus adapted for removing a stator vane segment according to claim 1, wherein the rotating machine comprises: a gas turbine compressor.

17. A method for removing a stator vane segment from a dovetailed slot in a lower casing of a rotating machine with stator vanes segments and rotating blades with an upper casing removed and the rotor in place, comprising:

applying a pushing force on a rear side of the stator vane segment;

clearing adhered materials between the stator vane segment and the casing slot; and applying a pulling force on a front side of the stator vane segment.

18. The method for removing a stator vane segment according to claim 17, the step of applying a pushing force comprising:

mounting a compression unit at an opening of a stator vane segment slot in a compressor casing;

feeding a compression train through the compression unit to abut an installed stator vane segment;

maintaining a pushing force with the compression unit through the compression train to the stator vane segment; and operating an impact head to vibrate the stator vane segment.

19. The method for removing a stator vane segment according to claim 17, the step of applying a pulling force comprising:

mounting a tension unit at an opening of a stator vane segment slot in a compressor casing;

feeding a tension train though the tension unit to abut an installed stator vane segment;

grasping a forward end of the stator vane segment by the tension train; and applying a pulling force with the tension unit.

20. The method for removing a stator vane segment according to claim 19, the step of grasping a forward end of the stator vane segment comprising:

latching a grasping device onto a forward vane of the stator vane segment.

21. The method for removing a stator vane segment according to claim 20, the step of latching a grasping device comprising:

lighting the forward end of the stator vane segment;

viewing the forward end of the stator vane segment; and positioning the grasping device to latch spring loaded arms of the grasping device over the forward vane of the stator vane segment.

22. The method for removing a stator vane segment according to claim 17, the step of clearing adhered materials comprising:

supplying a pressurized gas to a nozzle of the cleaning element; and directing the pressurized gas to a space between a dovetailed of the stator vane segment and the inner surface of the casing slot.

23. The method for removing a stator vane segment according to claim 17, further comprising:

attempting to remove a stator vane segment adjacent to an opening for the stator vane segment slot on each side of the compressor casing by manual means.

24. The method for removing a stator vane segment according to claim 17, wherein the rotating machine comprises: a gas turbine compressor.

* * * * *